G. B. GRAY.
CAR TRUCK CONSTRUCTION FOR ELECTRIC RAILWAY SIGNAL SYSTEMS.
APPLICATION FILED JULY 16, 1909.
1,008,030.
Patented Nov. 7, 1911.
2 SHEETS—SHEET 1.
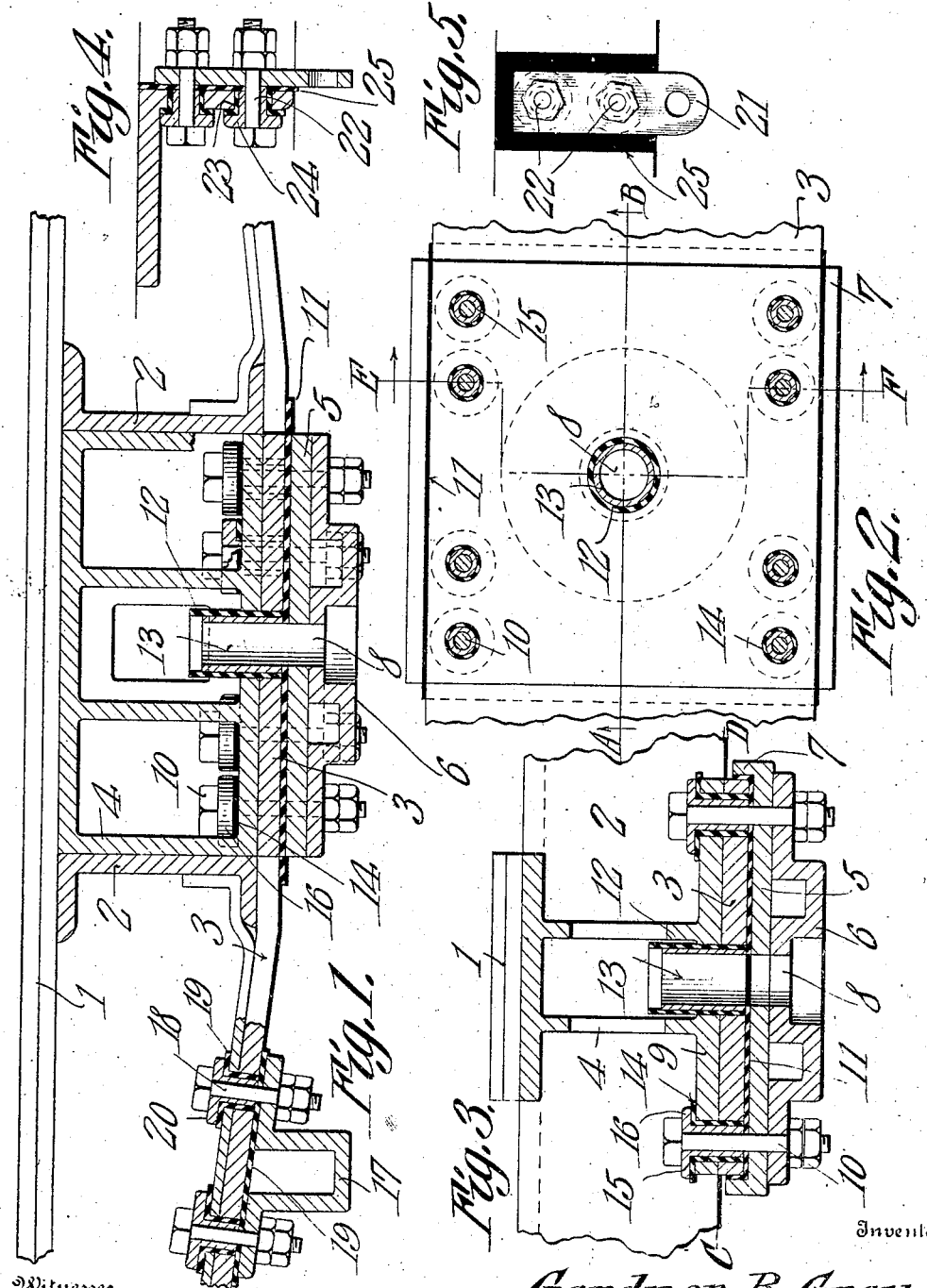
Witnesses
Inventor
Gardner B. Gray.
By C. A. Snow & Co.
Attorneys G. B. GRAY.
CAR TRUCK CONSTRUCTION FOR ELECTRIC RAILWAY SIGNAL SYSTEMS.
APPLICATION FILED JULY 16, 1909.
1,008,030.
Patented Nov. 7, 1911.
2 SHEETS—SHEET 2.
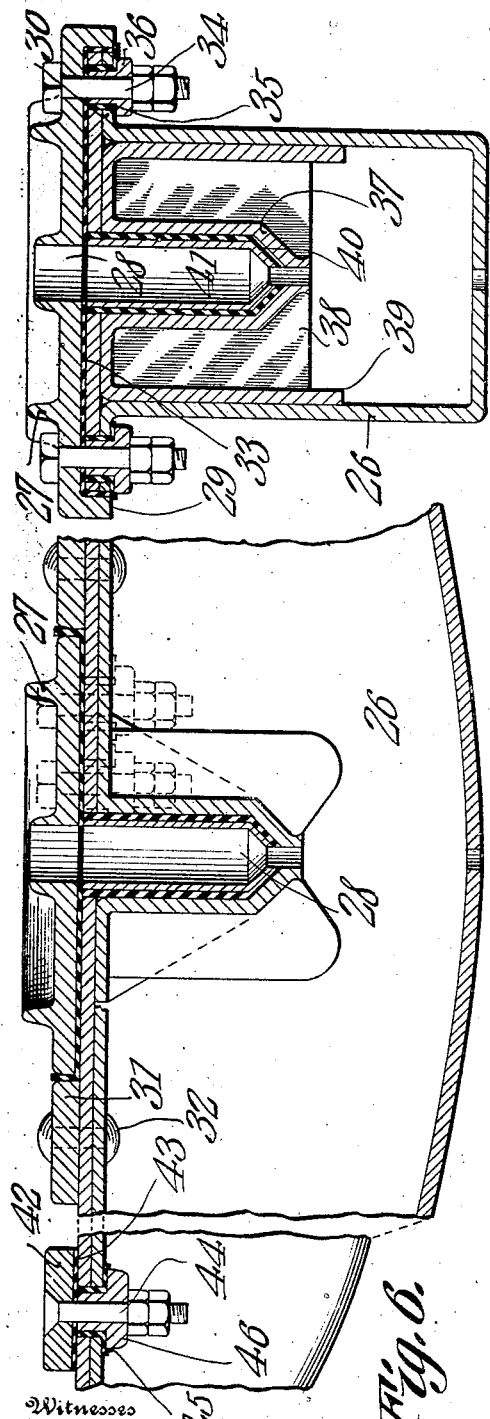
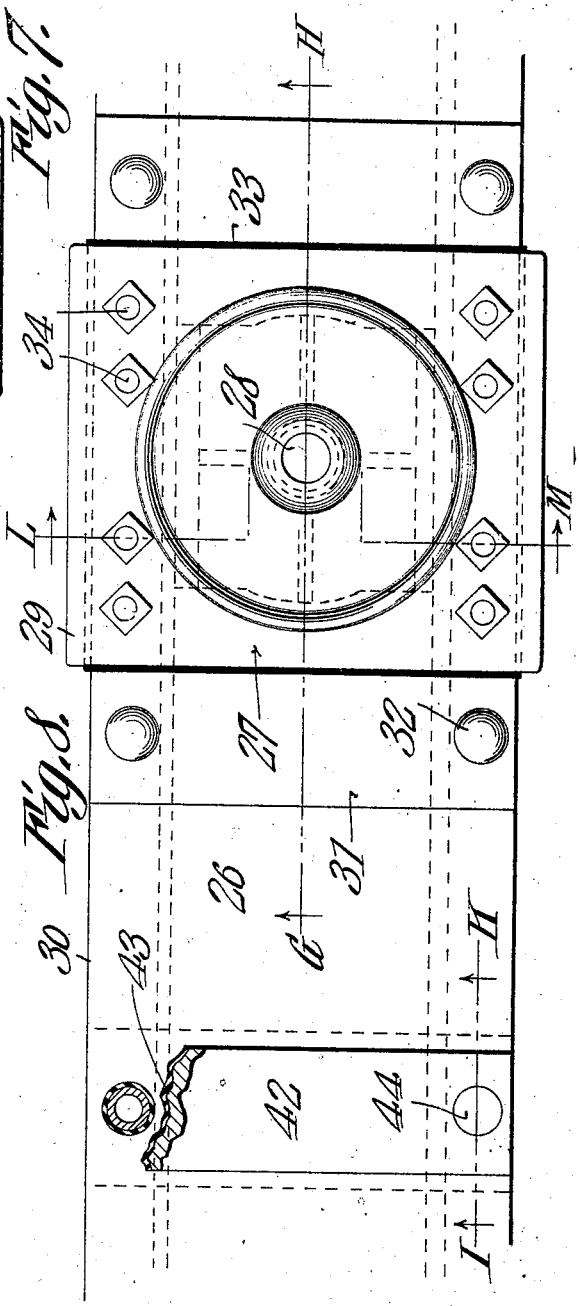
Inventor
Gardner B. Gray.
By C. A. Snow & Co.
Attorneys
Witnesses

UNITED STATES PATENT OFFICE.

GARDNER B. GRAY, OF PITTSBURGH, PENNSYLVANIA, ASSIGNOR TO GRAY-THURBER AUTOMATIC TRAIN CONTROL AND SIGNAL COMPANY OF AMERICA, OF PITTSBURGH, PENNSYLVANIA.

CAR-TRUCK CONSTRUCTION FOR ELECTRIC-RAILWAY SIGNAL SYSTEMS.

1,008,030.　　　Specification of Letters Patent.　　Patented Nov. 7, 1911.

Application filed July 16, 1909. Serial No. 507,988.

*To all whom it may concern:*

Be it known that I, GARDNER B. GRAY, a citizen of the United States, residing at Pittsburgh, in the county of Allegheny and State of Pennsylvania, have invented a new and useful Car-Truck Construction for Electric-Railway Signal Systems, of which the following is a specification.

This invention has reference to car truck construction for electric railway signal systems, more particularly a signal system of the type disclosed in Letters Patent No. 909,083 granted to me on January 5, 1909 for automatic safety signal system for railways and the object of the present invention is to provide a means whereby the wheels or truck of a railway vehicle may be insulated from the body of the same so that the operating current in a system of automatic train control such as disclosed in the said Letters Patent may be taken up from the running rails of a railroad track, the trucks being electrically insulated one from the other against electrical connection through the body of the vehicle whether the latter be a locomotive engine or a motor car such as is used on electric railways.

Since the safety of the trains operating on a system protected by the signal devices disclosed in the aforesaid Letters Patent, depends upon the perfect working of such a system, it becomes a matter of vital importance that the insulation be primarily perfect and inherently proof against breaking down.

In the signal system set forth in the aforesaid Letters Patent, the traffic rails are utilized for the transmission of operating current reaching electrical devices responsive to such currents and carried on the moving train, and more especially on the locomotive. Furthermore, the car wheels and axles are utilized for providing a practical short circuit between the rails under certain conditions demanded for the proper operation of the system, but for the proper operation of the system there should be no electrical connections between the trucks through the framework of the locomotive or motor car.

The present invention comprises means for insulating the car truck from the supporting bolster on the body of the car so that there shall be no electrical connection between the car truck and the car body, especially with the present day steel cars.

The invention will be best understood from a consideration of the following detail description taken in connection with the accompanying drawings forming a part of this specification, in which drawings—

Figure 1 is a sectional view of a car bolster partly on the line A—B of Fig. 2 and partly on a more remote line. Fig. 2 is a section on the line C—D of Fig. 3. Fig. 3 is a section on the line E—F of Fig. 2. Fig. 4 is a section of a hanger strap for one of the truck safety chains Fig. 5 is an elevation of the same. Fig 6 is a section of a portion of a truck bolster taken on the lines G—H and I—K of Fig. 8. Fig. 7 is a section on the line L—M of Fig. 8. Fig. 8 is a plan view of the structure shown in Fig. 6 with some parts broken away.

Referring to Figs. 1 to 3, there is shown a means for insulating the upper truck bearings from the steel frame of a car or other railway vehicle. There is shown at 1 the upper plate or top of the bolster and at 2 the center sills while at 3 is shown the bottom plate. Between the top plate 1 and the bottom plate 3 there is lodged a steel casting 4. Below the bolster plate 3 is a liner plate 5 and below this liner plate is the center plate 6 forming the upper truck bearing plate. It will be observed that the liner plate 5 is upturned at the ends as indicated at 7. Centrally through the center plate 6 and also through the other superposed portions is a passage 8 for the truck center pin. The casting 4 has lateral extensions 9 extending to the sides of the bolster plate 3 and passed through these side extensions 9, the bolster plate 3, the liner plate 5 and corresponding portions of the upper bearing plate 6 for the truck, are bolts 10 securing the several parts together.

Interposed between the lower surface of the bottom bolster plate 3 and the upper surface of the liner plate 5 is a sheet 11 of insulating material such as vulcanized fiber, the said sheet being coextensive with the liner plate 5 and upturned at the ends between the upturned ends 7 of said liner plate and the corresponding edges of the lowermost plate 3, this insulating sheet 11 thus thoroughly insulating the liner plate 5 from the lowermost plate 3 at all points where these two parts might come into contact. The passage through the lowermost plate 3 and through the casting 4 provided for the center pin is of larger diameter than the same passage through the upper bearing plate 6 and the liner plate 5. In the passage through the lowermost plate 3 and the casting 4 there is housed a sleeve 12 of insulating material interior to which is a metallic sleeve 13 having an internal diameter coinciding with the diameter of the center pin passage through the liner plate 5 and the upper bearing plate 6, but this sleeve 13 is of such external diameter that, when driven into the sleeve 12, the latter will be forced into firm engagement with the walls of the passages through the bolster plate 3 and casting 4. The sleeve 13 is by the insulating sleeve 12 effectually insulated from the bolster plate 3 and casting 4 so that it is immaterial that the center pin makes contact with the walls of the passage therefor through the upper bearings 6 and the liner plate 5. Furthermore the sleeve 13 serves as a metallic bearing for the center pin thus guarding the insulating sleeve 12 from contact with the center pin and injury thereby. Since the bolts 10 would otherwise electrically connect the bearing 6 and liner plate 5 with the bolster plate 3 and parts carried thereby, the passages for these bolts through the bolster plate 3 and the extensions 9 of the casting 4 are sufficiently enlarged to receive an insulating sleeve 14 in the form of a flanged bushing with the flange at one end and overriding the extension about the passage for said bushing while interior to the insulating bushing there is another bushing 15 having an annular flange or head 16 resting on the lateral extension of the insulating bushing 14, this head 16 serving as a seat for the head of the corresponding bolts 10. The bushings 15 are of slightly greater external diameter than the internal diameter of the insulating bushing 14 so that force must be used to introduce the bushings 15 into the bushing 14 and the latter are therefore tightly expanded against the walls of the passages provided for them. By this means the bolts 10 are most effectively insulated from the bolster plate 3 and casting 4 and consequently from the body of the car. While of course the insulating bushing may be made of any suitable material it is preferred to use vulcanized fiber. The metal bushings 15 save the insulating bushings 14 from injury by the bolts 10. When a truck is secured to the car body by a center pin extending through the opening 8 with the truck carried bearing plate engaging the bearing plate 6 it will be seen that the truck is most effectually insulated from the car body while the insulating material is well protected against injury from contact with metal surfaces which either do move or are liable to move with relation to the insulation, and furthermore the insulation is thoroughly protected from injury due to other causes. The truck and car body are however liable to come in contact at other points. For instance, when the car body swings or tilts over on rounding curves or from other causes, side bearings 17 on the bolster plate 3 are there located to engage the car truck and thereby prevent undue swinging of the car body toward the truck. These side bearings, of which one is shown in Fig. 1, are secured to the bolster plate 3 by means of bolts 18, but the side bearing is electrically insulated from the bolster plate by an interposed sheet 19 of insulating material of any suitable character, vulcanized fiber being usually preferred, while the bolts 18 are insulated from the bolster plate 3 and the parts carried thereby by means of insulating bushings 19 firmly seated in enlarged passages for the bolts through the bolster plate 3 by means of interior metal bushings 20, the insulating bushings 19 and metal bushings 20 being like the bushings 14 and 15 before described. It is also customary to connect the truck to the car body by safety chains and for this purpose there are provided eye plates 21 secured to the car body by bolts 22 insulated by bushings 23 and 24 of insulating material and metal respectively similar to the bushings 14 and 15 and the eye plate 21 is insulated from supporting metal parts by an insulating sheet 25. By these means all possible points of metallic contact between the car truck and the car body are effectually guarded by insulating material and therefore there is no danger of accidental circuits between the car truck and car body.

It may not always be expedient to insulate the top or upper truck bearings from the car body, nor in fact, to insulate either bearing from the car body, and in such case the lower or truck carried truck bearing and other parts carried by the truck and liable to be electrically connected with the car body must be insulated from the truck.

In Figs. 6, 7 and 8 the truck bolster is indicated at 26 and at the center of the truck bolster there is secured the lower bearing plate 27 of the truck. Through this bearing plate is a passage 28 for the truck center pin, the bearing plate 27 matching the bearing plate 6 of the body bolster of the car and the center pin passage 28 matching the center pin passage 8 of the car body bolster. The bearing plate 27 has downturned edges 29 embracing the sides of out-turned flanges 30 formed along the bolster 26. On each side of the plate 26 there is secured to the bolster a strip 31 by rivets 32 or otherwise but these strips 31 are spaced a short distance from the corresponding edges of the bearing plate 27.

Interposed between the bottom of the bearing plate 27 and the top of the bolster 26 is a sheet 33 of insulating material, preferably vulcanized fiber, though of course this insulating material may be of other composition than vulcanized fiber. The edges of the sheet 33 where adjacent to the downturned edges 29 of the plate 27 are continued along said downturned edges so as to separate them from the outer edges of the bolster 26 at this point. The other edges of the sheet 33 where the plate 27 and the strips 31 are in juxtaposition, are upturned to prevent contact between the said edges and the said strips. Of course the downturned and upturned portions of the insulating sheet 33 may be in one piece therewith or these parts may be separate strips of insulation. The plate 27 is secured to the bolster 26 by means of a suitable number of bolts 34 and these bolts are insulated from the bolster by means of flanged bushings 35 inserted in enlarged passages through the flanges of the bolster 26 and these flanged insulating bushings are forced into intimate contact with the walls of the passages by means of flanged bushings 36 driven into the bushings 34 so as to expand the latter against the walls of the passages. The bolts 34 pass directly through the metal bushings 36 the same as described with reference to the bolts 10 of the structure of Figs. 1, 2 and 3. Secured within the bolster 26 is a socket 37 connected by webs 38 to side plates 39 engaging the side walls of the bolster and secured thereto in any suitable manner. The socket 37 is tapered at the lower end and has an interior lining 40 of insulating material which latter is forced into intimate contact with the inner walls of the socket by means of a sleeve 41 having a taper lower end conforming to the shape of the socket. The sleeve 41 is thoroughly insulated from the socket 37 by the lining 40 of insulating material. The socket 37 by means of the sleeve 41 receives the center pin of the truck. The side bearings 17 of the car body are received upon the bolster of the truck by lateral plates or stops 42 and when the side bearings are not insulated from the car body then the plates 42 are insulated therefrom by means of a sheet 43 of insulating material interposed between the said plates or strips 42 and the top of the bolster 26. These strips 42 are held in place by bolts 44 and the bolts are insulated from the bolster by means of insulating bushings 45 interposed between the bolt holes through the bolster and a metal bushing 46 immediately surrounding the bolt and forced into the insulating bushing 45 thus locking the latter in place.

The structure shown in Figs. 4 and 5 has been described as being carried by the car structure may be as well carried by the truck and the safety chains thereby insulated from the car truck, in which case they may be in metallic contact with the car body without harm.

By insulating the truck from its bearings, or by insulating the bearings from the body bolster, the truck is insulated from the car body frame more effectively than though it were attempted to insulate the car axles and wheels from their supports. Furthermore, the broad area of the car axle bearings between the truck and its bearings or between the bearings and the body bolster permit the use of a correspondingly broad area of insulation which latter is therefore enabled to stand the heavy mechanical load imposed thereon without deleterious effect while danger of the insulation breaking down electrically is reduced to a negligible minimum.

By making the side bearings on either the body bolster or the truck bolster separate from the respective bolsters they may be readily secured thereto in insulated relation to these bolsters and by making the eye plates for the safety chains also separate they may be readily secured to the truck or car body in insulated relation thereto so that whichever construction be adopted the truck is positively insulated at all points from electrical connection with the car body.

In the aforesaid patent there is described a system whereby the truck must electrically bridge the traffic rails, but two separated trucks on a car must be electrically insulated one from the other so as not to bridge insulation sections interposed in the traffic rails. By insulating the separate trucks from the car body frame, each truck becomes electrically insulated without interfering with its conducting qualities from one traffic rail to the other.

The construction embodying the present invention has been found to perfectly meet all the conditions demanded by the signal system set forth in the aforesaid Letters Patent even under the severe conditions of ordinary traffic.

What is claimed is:

1. In car truck construction, a center bearing plate having ends turned over the corresponding edges of the bolster carrying it, insulation between the plate and its turned over edges and the bolster, the said plate, insulation and bolster having matching bolt holes, the bolt holes through the bolster being larger than through the center plate, insulation bushings in the holes of the bolster, metal bushings interior to the insulation bushings, and bolts traversing the metal bushings and the center plate.

2. In car truck construction, a center bearing plate having ends turned over the correinsulation between the plate and its turned over edges and the bolster, an insulating sleeve interior to the center pin passage of the bolster, a metal sleeve interior to the insulation sleeve, and insulated bolts connecting the center plate to the bolster.

3. In car truck construction, a center bearing plate having insulation between the same and the bolster carrying it, insulated bolts securing the center plate to the bolster, the insulation being interposed between the bolts and the bolster and provided with interior metal linings, an insulation lining for the center pin passage of the bolster, a metal sleeve interior to the center pin insulation, insulated side bearings for the truck, and insulated safety chain connections for the truck.

In testimony that I claim the foregoing as my own, I have hereto affixed my signature in the presence of two witnesses.

GARDNER B. GRAY.

Witnesses:
W. M. McJUNKIN,
IRENE BUSHFIELD.